Patented Jan. 5, 1943

2,307,288

UNITED STATES PATENT OFFICE 2,307,288

PROCESS FOR MAKING ELECTRICAL RESISTORS

George E. Megow, South Milwaukee, Wis., assignor to Allen-Bradley Company, Milwaukee, Wis., a corporation of Wisconsin No Drawing. Original application April 28, 1937, Serial No. 139,586, which is a division of application Serial No. 737,927, August 1, 1934, now Patent No. 2,096,992, dated October 26, 1937. Divided and this application October 16, 1939, Serial No. 299,622

4 Claims. (Cl. 201—76)

My invention relates in general to the obtainment of carbon in small particle size uniformly dispersed in a matrix, and is a division of my application filed April 28, 1937, Serial No. 139,586, which is a division of my application filed August 1, 1934, Serial No. 737,927, Patent No. 2,096,992 issued October 26, 1937.

Heretofore carbon in extremely small particle size or colloidal form was obtainable in liquid suspension or in dry state which in these forms when mixed with another substance did not give an even dispersion of the carbon in the substance.

The manufacturers of electrical devices such as resistors used in radio circuits have sought for carbon in usable form of a small size. The above-mentioned resistors are of necessity required to be of great uniformity in physical characteristics and therefore an even distribution of the carbon conductor throughout the body of the resistor is also required.

It is therefore an object of my invention to obtain carbon in small particle size and further to provide a method where this carbon of small particle size is uniformly distributed into the material of the article in which the carbon is used.

I have found that electrical resistors as used in radio circuits have been greatly improved by the use of carbon made according to my invention.

It is a known fact that various gels such as silica gel, and precipitates such as aluminum hydroxide have the property of adsorbing tannic acid, gum catechu, Congo red, carbon suspensions and other similar carbon bearing materials.

I have discovered that this unique characteristic of gels and precipitates can be utilized in preparing a finely divided form of carbon by first adsorbing the carbon bearing material, such as tannic acid, with aluminum hydroxide, and then carefully dehydrating and calcining the combination to yield a finely divided form of carbon and that this carbon is embedded in a matrix of aluminum oxide. In the case of adsorption of tannic acid by silica gel and carrying out the same process, the carbon is embedded in a matrix of silicon dioxide. I have also used a combination of silica gel and aluminum hydroxide with tannic acid and in carrying out the same process the carbon is embedded in a matrix of silicon dioxide and aluminum oxide or a matrix of aluminum silicate depending upon the calcining temperature used.

I have further discovered that if the process is carried out by first preparing the gel and then mixing the carbon bearing material with the gel, the amount of carbon bearing material adsorbed will be less than that which can be adsorbed by a modification of the process. To secure this increased adsorption it is only necessary to form the gel in the presence of the carbon bearing material.

An example of this method is as follows: A five per cent solution, by weight, of aluminum chloride in water, is prepared, to which is added a fifty per cent solution, by weight, of tannic acid in water, using three hundred fifty parts of aluminum chloride, dry basis, and two hundred fifty parts of dry tannic acid. When the solutions are mixed a slight precipitate will form which later dissolves forming a clear brown solution. The reactions are carried out in this dilute form so as to avoid the formation of aluminum tannate in an undissolved form before forming the precipitate.

The formation of the gel is accomplished by adding a base such as ammonium hydroxide until the solution is neutral. As the precipitate forms the tannic acid is adsorbed by the aluminum hydroxide. The gel and adsorbed tannic acid is then separated from the excess tannic acid, water, and ammonium chloride by filtering and washing. In the mix given above practically all of the tannic acid will be adsorbed. At the present time I have not been able to determine the maximum amount of tannic acid that can be adsorbed by this process because the amount adsorbed depends upon the purity of the tannic acid, the dilution of the reagents, and temperature and rate of mixing during the formation of the gel.

There is, however, a pronounced difference in the amounts of tannic acid adsorbed when the gel is prepared by the method just described as compared with the method wherein the gel is prepared out of contact with the tannic acid. The washed filter cake is carefully dehydrated and then calcined to yield an extremely fine dispersion of carbon in a matrix of aluminum oxide.

This method of preparation has the advantage of forming a gel in contact with a carbon bearing compound in such a manner that a high degree of uniformity of composition can be obtained. As the precipitate forms, a definite amount of carbon bearing material is adsorbed and as there is a slight excess present all of the gel forms with the maximum amount of carbon bearing material uniformly distributed throughout the mass of gel in the adsorbed state. Any excess not adsorbed by the gel is removed by washing with water.

Minute wedge-like chips of aluminum oxide and carbon have been examined microscopically to determine the fineness of the carbon and the uniformity of the carbon throughout the matrix. The thin edges that are transparent when examined at sixteen hundred fifty diameters appear as a clear transparent light brown field in which it is impossible to locate particles of carbon of sufficient size to even estimate their size. The dispersion is apparently quite uniform although it is difficult to make any exact statement because there are few, if any, regularly formed pieces which may be examined accurately.

A use mentioned for this material is in the formation of electrical resistance devices wherein the finely divided carbon in an insulating matrix forms a composite resistance. Material of this type can also be used as an addition to a ceramic mix or as an addition to an organic binder to form a resistor. In the manufacture of a ceramic unit a desirable procedure is to form the gel and carry out the adsorption process in a suspension of the ceramic forming body, followed by filtering, washing, forming, dehydrating, calcining, and firing to vitrification.

The method of manufacturing resistors given above comprises the following detailed steps. After completion of the adsorption process the mixture is filtered and washed to remove the excess water and the undesirable reaction products of the adsorption process. The prepared mixture is then formed into suitable shape by any of the usual methods employed in the ceramic art. It is then carefully dehydrated and heat treated at a suitable temperature to vitrify the ceramic material and convert the carbon bearing compound to carbon.

From the foregoing description it will be readily apparent to those skilled in the art to which an invention of the character described appertains, that I provide a novel method of subdividing carbon into small particle size and provide for its use in an evenly dispersed form. I attribute the success of my invention to the even dispersion of carbon of small particle size in a matrix, however, I do not want to limit myself to this disclosure as outlining the bounds of my invention but rather an example of what may be accomplished with the method I have outlined.

What I claim as my invention is:

1. A process of making an electrical resistor comprising the steps of mixing a suitable quantity of gel adsorbable carbon bearing compound with a ceramic material containing an adsorbent gel forming ingredient, converting said gel forming ingredient to a gel and simultaneously adsorbing said carbon bearing compound by said gel, forming the mixture into suitable shape, and thereafter heat treating to yield a resultant electrical conducting product of ceramic material and carbon.

2. The process of making an electrical resistor comprising the steps of mixing a suitable quantity of gel adsorbable carbon bearing compound with a ceramic material that contains an aluminum salt, adding a base to form aluminum hydroxide gel and simultaneously adsorbing said carbon bearing compound by said gel, forming the mixture into suitable shape and thereafter heat treating to yield a resultant electrical conducting product of ceramic material and carbon.

3. The process of making an electrical resistor comprising the steps of mixing a suitable quantity of gel adsorbable carbon bearing compound with a ceramic material that contains a soluble silicate, converting said soluble silicate to a gel and simultaneously adsorbing said carbon bearing compound by said gel, forming the mixture into suitable shape and thereafter heat treating to yield a resultant electrical conducting product of ceramic material and carbon.

4. The process of making an electrical resistor comprising the steps of adding a suitable quantity of adsorbable carbon bearing compound and an adsorbent gel forming ingredient to a ceramic material, converting said gel forming ingredient to a gel and simultaneously with the formation of said gel adsorbing said carbon bearing compound thereby, and thereafter heat treating to yield a resultant electrical conducting product of ceramic material and carbon.

GEORGE E. MEGOW.